US 9,838,455 B2

(12) United States Patent
Einarsson

(10) Patent No.: US 9,838,455 B2
(45) Date of Patent: Dec. 5, 2017

(54) FAST ENCODING OF LIVE STREAMING MEDIA CONTENT

(71) Applicant: MobiTV, INC., Emeryville, CA (US)

(72) Inventor: Torbjörn Einarsson, Stockholm (SE)

(73) Assignee: MobiTV, Inc., Emeryville, CA (US)

( * ) Notice: Subject to any disclaimer, the term of this patent is extended or adjusted under 35 U.S.C. 154(b) by 151 days.

(21) Appl. No.: 14/491,950

(22) Filed: Sep. 19, 2014

(65) Prior Publication Data

US 2016/0088050 A1    Mar. 24, 2016

(51) Int. Cl.
*H04L 29/06* (2006.01)

(52) U.S. Cl.
CPC ........ *H04L 65/607* (2013.01); *H04L 65/4069* (2013.01); *H04L 65/4084* (2013.01); *H04L 65/60* (2013.01); *H04L 65/602* (2013.01); *H04L 65/608* (2013.01)

(58) Field of Classification Search
CPC .... H04L 65/607; H04L 65/4069; H04L 65/60
See application file for complete search history.

(56) References Cited

U.S. PATENT DOCUMENTS

| | | | | |
|---|---|---|---|---|
| 8,837,601 | B2* | 9/2014 | Ronca | H04N 19/124 375/240.16 |
| 9,197,932 | B1* | 11/2015 | Wannamaker | H04N 21/231 |
| 2001/0044851 | A1* | 11/2001 | Rothman | H04H 20/82 709/231 |
| 2007/0121629 | A1* | 5/2007 | Cuijpers | H04L 12/1859 370/390 |
| 2007/0130597 | A1* | 6/2007 | Parker | H04H 20/38 725/94 |
| 2008/0098284 | A1* | 4/2008 | Wolfgang | H04L 1/007 714/776 |
| 2008/0304565 | A1* | 12/2008 | Sakhardande | H04N 5/76 375/240.12 |
| 2013/0064287 | A1* | 3/2013 | Karlsson | H04N 19/46 375/240.02 |
| 2014/0013376 | A1* | 1/2014 | Xu | H04N 21/25 725/116 |

* cited by examiner

*Primary Examiner* — Aaron Strange
(74) *Attorney, Agent, or Firm* — Kwan & Olynick LLP

(57) ABSTRACT

Techniques and mechanisms described herein facilitate the management of encoders for live media content streams. A media content system may employ potentially many encoders to encode potentially many live media content streams. When supporting many live media content streams, there may be some channels that are not being viewed by anyone at a particular time. In some such situations, an encoder encoding a live media content stream that is not being viewed may be disabled. Then, live media content associated with the live media content stream may be stored in a buffer and updated as new live media content is received. When a user transmits a request to view a channel for which the encoder has been disabled, an encoder for the requested channel may be enabled. The buffered data may be used to quickly initialize the encoder.

20 Claims, 5 Drawing Sheets

FAST ENCODING OF LIVE STREAMING MEDIA CONTENT

TECHNICAL FIELD

The present disclosure relates to the provision of streaming media content.

DESCRIPTION OF RELATED ART

A media content system may make a number of media content streams available for viewing upon request by users. In some systems, the number of available streams may be quite large, numbering in the hundreds or thousands. The media content system may generate a media content stream internally or receive a live media content stream from a remote content source. In either case, the media content stream may be encoded by an encoder for transmission to client devices. For instance, an encoder may encode the media stream according to a particular type of content format, bit rate, or other characteristic. Some media streams may be encoded in more than one format, for instance for delivery to different types of client devices.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
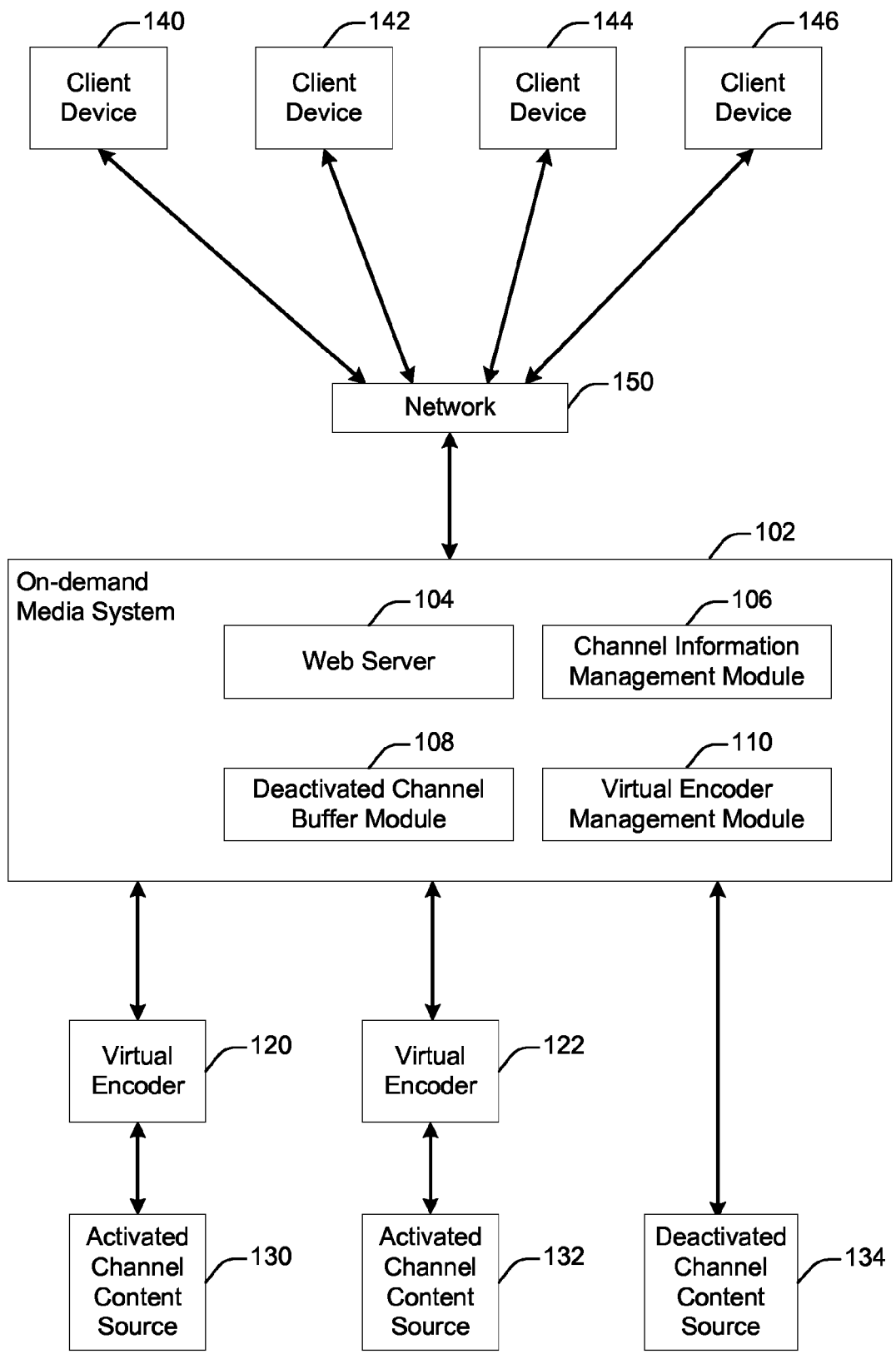
FIG. 1 illustrates an example of a system, configured in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular content streams, servers, and encoding mechanisms. However, it should be noted that the techniques of the present invention apply to a wide variety of different content streams, servers, and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the management of encoders for live media content streams. A media content system may employ potentially many encoders to encode potentially many live media content streams. When supporting many live media content streams, there are often some channels that are not being viewed by anyone at a particular time. In some such situations, an encoder encoding a live media content stream that is not being viewed may be disabled. Then, live media content associated with the live media content stream may be stored in a buffer and updated as new live media content is received. When a user transmits a request to view a channel for which the encoder has been disabled, an encoder for the requested channel may be enabled. The buffered data may be used to quickly initialize the encoder.

Example Embodiments

According to various embodiments, users of client devices may receive content from a content management service. The content management service may facilitate the interaction of users with various types of content. For instance, the content management service may provide a user interface for managing and accessing content from a number of different content sources. The interface may display content received via a cable or satellite television connection, one or more on-demand-video service providers such as Netflix or Amazon, and/or content accessible on local or network storage locations. In addition, the interface may be used to access this content on any number of content playback devices, such as televisions, laptop computers, tablet computers, personal computers, and mobile phones. At least some of the content may include live audio and/or video streams.

According to various embodiments, media content systems may include a number of media content encoders to encode live media content streams. At least some of these media content encoders may be implemented at least in part in software. For instance, virtual machines may be used to allow software encoders to be enabled and disabled upon request. In some systems, cloud technologies may allow dynamic configuration of encoding resources and variable costs based on actual resources used. For instance, the cost of encoding content may be reduced if an encoder encoding a live media content stream is disabled when no viewer is viewing the live media content stream.

In particular embodiments described herein, a software encoder may be created and initialized for a live media content stream when the live media content stream is requested for viewing by a client machine. Then, the encoder may be disabled when the live media content stream is no longer being viewed. However, in conventional systems, a request to view a live media content stream for which the encoder is not enabled may be followed by a significant delay as the encoder for the live media content stream is initialized. For instance, an encoder being initialized in a conventional system may need to wait until it receives a key-frame or other initial segment portion before it can encode a segment of content. Such initial segment portions are often arranged at intervals of one to several seconds. In addition, encoding of an entire segment cannot be completed until the last frame of the segment has been received. Thus, in a conventional system, initializing an encoder requires both an initial waiting period of up to one key-frame interval and another waiting period in which data is gathered of one key-frame interval.

Thus, in conventional systems, the time required to initialize the encoder, begin encoding content, and transmit the newly encoded content to a requesting client device may be increased accordingly. In contrast, a live media content stream for which an encoder is already activated may frequently be accessed with little or no delay noticeable to a user. Introducing a noticeable delay into channel access may degrade user experience relative to systems in which each available live media content stream is encoded regardless of whether the live media content stream is being transmitted to a client device.

According to various embodiments, techniques and mechanisms described herein may facilitate the potentially cost-saving measure of disabling an encoder for a live media content stream that is not being viewed while mitigating or eliminating any delay associated with enabling an encoder for the live media content stream when the live media content stream is requested by a viewer. When an encoder for a live media content stream is not enabled, a buffer associated with the live media content stream may be maintained. The buffer may store a portion of recently received pre-encoded content. For instance, 20 seconds, a minute, or another length of time of pre-encoding content may be retained. The recently received pre-encoded content may include one or more key-frames or other initial segment portions. In this way, an encoder that is initialized when a live media content stream may access the recently received pre-encoded content so that the encoder may begin encoding immediately and not need to wait to receive a key-frame or other initial segment portion in pre-encoded media content data received live by the encoder.

According to various embodiments, the techniques and mechanisms described herein may apply to various live content streaming configurations. For example, the techniques may apply to Hypertext Transfer Protocol (HTTP) streaming using HTTP Live Streaming (HLS), Dynamic Adaptive Streaming over HTTP (DASH), Smooth Streaming, and/or other such technologies. As another example, the techniques may apply to content streamed in accordance with Real-time Transport Protocol (RTP), Real Time Streaming Protocol (RTSP), and/or Transport Stream (TS) technologies. The input stream to the live encoder may be configured in accordance with Moving Picture Experts Group (MPEG)-2 TS or any other suitable streaming input formats.

FIG. 1 illustrates an example of a system, configured in accordance with various techniques and mechanisms of the present invention. The system shown in FIG. 1 is configured for streaming of a number of live streaming media content channels to a plurality of client devices. The system includes an on-demand media system 102 in communication with the virtual encoders 120-122 and configured to receive media content input data from the channel content sources 130-134. The media system 102 is configured to transmit live streaming media data to the client devices 140-146 via the network 150.

In particular embodiments, the media system 102 may be configured to provide a variety of on-demand media content. This content may include, but is not limited to live streaming media content channels such as television channels. For instance, the media system 102 may be configured to provide access to potentially hundreds of television channels. A live streaming media content channel may include any source of video and/or audio content that is available on a live streaming basis. That is, the content presented on the live streaming media content channel varies over time and is live rather than selectable.

According to various embodiments, a client device may view media content by transmitting a request for a media content item to the on-demand media system 102 via the network 150. For instance, a user at the client device may select a channel for viewing in a media content guide. The request may be received at the web server 104. The web server may transmit a response to the client device that includes information such as how to access the requested channel. For instance, the web server may transmit a network address for accessing the requested media content, a description of the media content to be received via the channel, and/or any other relevant information.

In particular embodiments, the web server 104 may transmit and/or receive one or more messages to other modules within the on-demand media system 102. For instance, the web server 104 may communicate with the channel information management module 106 to identify the requested channel and/or receive channel description information for the requested channel.

According to various embodiments, each live streaming media content channel may be received as input data by the on-demand media system 102. For instance, the data may be received from a content source such as a satellite teleport, or over an IP network using UDP multicast. The media may have one or more video streams, one or more audio streams, and/or one or more subtitle streams, any or all of which may be encapsulated in one or more MPEG-2 transport stream. The origin video may be encoded at high quality using a video coding standard such as HEVC/H.265, AVC/H-264 or MPEG-2. Using multicast, the same source can be distributed to multiple encoders that can produce variants of different quality and bitrate. Each encoder can make one or more variants. Another possible configuration is one in which source data is made available to multiple encoders using individual connections from the encoders towards a common server, such as an HTTP server, which provides the TS stream as a continuous or segmented stream.

According to various embodiments, data received from a channel content source may be encoded for transmission to client devices. For instance, data from the activated channel content source 130 is encoded by the virtual encoder 120, while data from the activate channel content source 132 is encoded by the virtual encoder 122. Each virtual encoder may be implemented as a non-static resource on a virtual machine. Each virtual encoder may be configured to be activated and deactivated upon request. A single virtual machine may operate one or more virtual encoders.

In particular embodiments, source data from a single live streaming content source may be encoded in any of various ways. For instance, the source data may be encoded at different bit rates or in different encoding formats. This encoding may be performed by the same virtual encoder or by different virtual encoders.

The configuration and management of virtual encoders and the encoding of source data may be managed by the virtual encoder management module 110. In some implementations, the virtual encoder management module 110 may be responsible for such operations as initiating virtual encoders, activating live streaming content source channels, deactivating live streaming content source channels, and deactivating virtual encoders.

Although FIG. 1 shows each activated channel content source being received directly by a virtual encoder, in various embodiments media may be received in any of various ways. For example, multicast channel source data may be received by the virtual encoding module 110 and then provided to the appropriate virtual encoder. For instance, the virtual encoding module 110 may provide the same source data to different virtual encoders for encoding in different format. Alternately, a master encoder may encode the same source data into different formats.

At any given time, many of the live streaming media channels available via the media system 102 may be viewed by any number of client devices. However, in some instances a media channel that is available for viewing via the media system 102 may not be actually transmitted to any client device. For instance, the channel may be one that has not recently been requested for viewing by any client device. In such instances, the channel may be deactivated. A deactivated channel may be one for which source input data is available but for which the source input data is not encoded for transmission to client devices.

The deactivated channel content source 134 represents a source of live streaming media input data that is not being actively encoded for transmission to one or more client devices. Live streaming media input data received from the deactivated channel content source 134 may be stored in the deactivated channel buffer module 108 to facilitate rapid activation of the deactivated live streaming media channel. The data may be stored in a storage medium configured for rapid access, such as RAM, FLASH, or on a disk drive. The deactivated channel buffer module 108 may store any appropriate amount of live streaming content channel input data.

In particular embodiments, the buffer may store a minimum amount of data necessary in a particular configuration for rapid activation of a previously deactivated channel. Such an amount of data may be, for example, several seconds. However, the minimum amount of necessary data may depend on various factors such as GoP length in the source stream, desired output segment or fragment length, encoding speed, and network latency.

In particular embodiments, the buffer may store an amount of data that exceeds the minimum, such as 30 seconds, several minutes, 30 minutes, or some other amount. Storing a greater amount of data may provide one or more advantages such as facilitating time shifting. When time shifting is supported, a user requesting to view a deactivated live streaming media content channel may not only view the channel quickly due to the rapid channel activation techniques discussed herein, but may also view the channel for some time into the past. For instance, a user who starts viewing the channel a few minutes after the beginning of a program may "rewind" to view the beginning of the program, although that part of the program was not previously encoded.

In particular embodiments, the activation of a live streaming media content channel may involve one or more single encoders. For example, each live streaming media content channel may be assigned to a single virtual encoder for encoding. As another example, a single live streaming media content channel may be assigned to two or more virtual encoders for encoding. For instance, the deactivated channel buffer module 108 may store an amount of data for a live streaming media content channel that would require some non-trivial period of time for a single virtual encoder to encode. In this case, the buffered data may be split among more than one virtual encoder to speed the activation process. Then, after the buffered data is encoded and the live streaming media content channel is activated, any virtual encoder not needed for continuing to encode new live streaming media content channel source data may be shut down.

In some configurations, one possible advantage of enabling multiple encoders is to be able to encode faster. For example, one of the encoders may encode one 2 second splice of a video sequence, while another encodes a second splice. In this way, the encoder farm succeeds in making two segments available in the same time as only one would normally be made.

According to various embodiments, a client device receiving streaming media content data from the on-demand media system 102 may receive the data as a collection of segments or fragments. In order to determine the segments or fragments to request, the client device may also receive a description of the encoded media content data associated with the media content channel. The description may be referred to as a manifest file, template, segment list, or other such term. The description may, for instance, list the available segments or fragments and/or include ordering information for the segments or fragments. The description may contain a template and timing information that facilitates the calculation by the client device of the segments currently available for a live stream.

In particular embodiments, the channel information management module 106 may track, store, transmit, and/or generate the channel description information. Channel description information may be automatically generated as a product of the encoding process. The channel information management module 106 may store channel description information for activated live streaming media content channels. Alternately, or additionally, the channel information management module 106 may be configured to generate channel description information for deactivated live streaming media content channels. For instance, waiting for a newly activated virtual encoder to generate channel description information for a previously deactivated live streaming media content channel may introduce unnecessary delay when the channel is activated. Accordingly, the channel information management module 106 may track segment or fragment information and be generated initial description information quickly when a previously deactivated live streaming media content channel is activated.

The client devices 140-146 may view media content transmitted from the on-demand media system 102 via the network 150. According to various implementations, a client device may be a mobile computer, a laptop computer, a desktop computer, a set top box, a smart television, or any other network-enabled device capable of receiving content for presentation.

According to various embodiments, the network 150 may be any network or combination of networks configured to transmit information. For instance, the network 150 may include a wide area network (WAN), a local area network (LAN), a metropolitan area network (MAN), the Internet, a cellular network, a satellite network, or any other suitable type of network.

Figure 2:
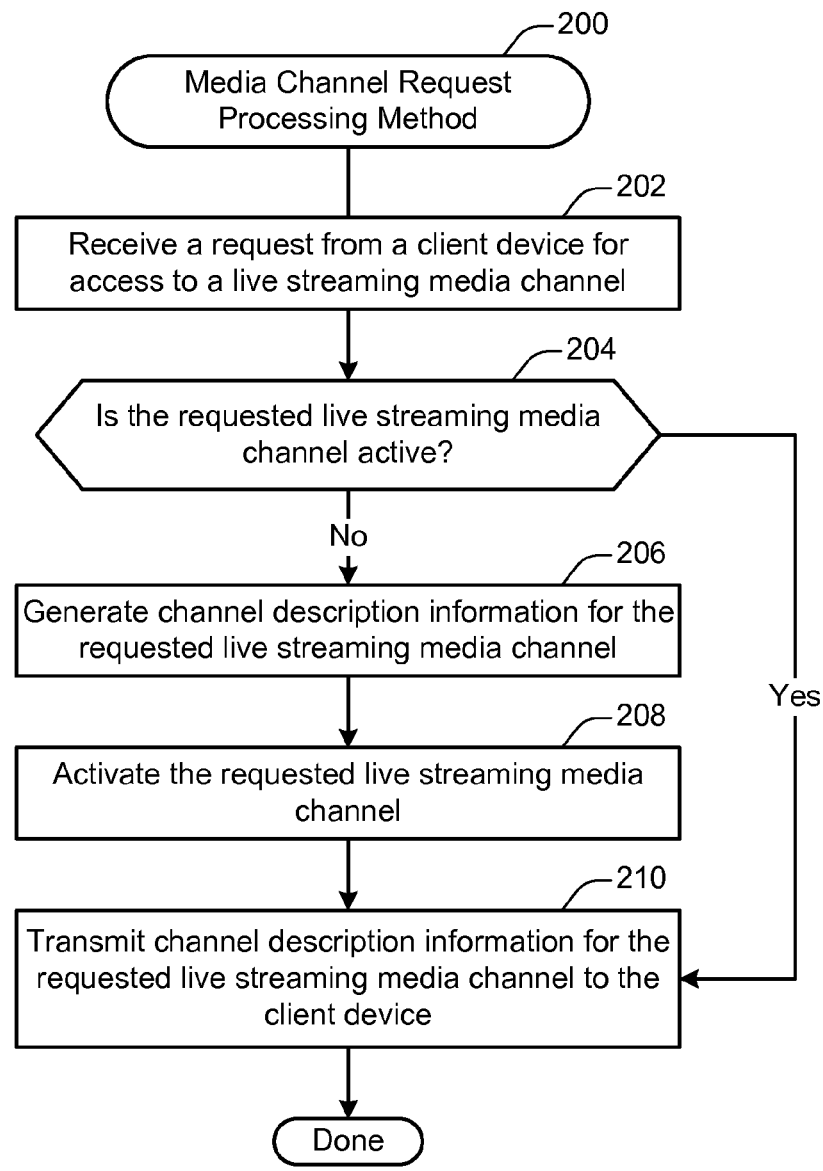
FIG. 2 illustrates an example of a method for processing a request for a media channel, performed in accordance with various techniques and mechanisms of the present invention.

FIG. 2 illustrates an example of a method 200 for processing a request for a media channel, performed in accordance with various techniques and mechanisms of the present invention. The method 200 may be performed at a media system, such as the media system shown in FIG. 1.

At 202, a request is received from a client device for access to a live streaming media channel. According to various embodiments, the request received at 202 may indicate a channel selection event at a client device. For instance, a client device such as a laptop computer, mobile device, or set top box may receive user input that selects the live streaming media channel for presentation at the client device.

In some embodiments, the request from the client device may be received at a web server, such as the web server 104 shown in FIG. 1. As discussed with respect to FIG. 1, the web server 104 may be operable to provide media access and management services for coordinating access by potentially many different client devices to potentially many different media sources and/or media channels.

In some implementations, the channel selection event may be generated or received at the client device. For instance, a user may provide user input at a mobile device indicating a live streaming media channel to access. Alternately, or additionally, the channel selection event may be generated at a different device, such as a remote control in communication with the client device.

In particular embodiments, the request received from the client device may include a request for media channel description information. For example, in the HTTP live streaming context, the request may include a request for a manifest file. As another example, in the DASH context, the request may include a request for an MPD media presentation description file. Correspondingly, for SmoothStreaming, the client may also request a manifest file.

In particular embodiments, the request received from the client device may include a request for DRM or other licensing information to allow the client device to decrypt the live content channel. For instance, the live content channel may be encrypted with any suitable encryption scheme in order to prevent unauthorized access.

At 204, a determination is made as to whether the requested live streaming media channel is activated. According to various embodiments, the determination may be made by consulting information associated with a media system module operable to manage media channel access information for the media system. For instance, the channel information management module 106 shown in FIG. 1 may store an indication of which channels accessible via the on-demand media system 102 are activated at a given time.

At 206, if it is determined that the requested live streaming media channel is not activated, then channel description information is generated for the requested live streaming media channel. According to various embodiments, the channel description information may be generated at least in part by analyzing buffered channel input data stored in the deactivated channel buffer module 108 shown in FIG. 1. For instance, the buffered channel input data may be analyzed to identify Random Access Points such as GoP boundaries for encoded media content data generated by encoding the buffered channel input data. Alternately, or additionally, the buffered channel input data may include encoder-specific parameters that describe the content to be encoded. These parameters may include, but are not limited to: video codec profile and level, width and height, audio codec information, and audio codec parameters such as sampling rate.

In particular embodiments, the channel description information may be generated as part of a procedure for encoding a media channel. However, when a requested channel is deactivated, waiting for the initiation of channel encoding and the subsequent creation of the channel description information to provide the channel description information to a client device may introduce delay into the process of providing the client device with access to the requested channel. Accordingly, when a request is received for a deactivated live streaming media channel, the initial channel description information may be generated apart from the encoding of the live streaming media channel, thus reducing or eliminate the delay associated with providing the channel description information for the requested channel. The information to generate such information in advance may include encoder settings and cached information from an earlier run of the same or similar encoder.

At 208, the requested live streaming media channel is activated. In some implementations, activating the requested live streaming media channel may involve operations such as initiating a virtual encoder for encoding the requested live streaming media channel. Techniques for activating a live streaming media channel are discussed in additional detail with respect to the method 300 shown in FIG. 3.

At 210, channel description information for the requested live streaming media channel is transmitted to the client device. According to various embodiments, the channel description information may be transmitted to the client device via a communications interface operable to transmit information over a network. As discussed with respect to operation 206, the channel description information may indicate to the client device how to access and/or decode the requested live streaming media channel. When a channel is active, channel description information may be generated as part of the encoding process and managed via the channel information management module 106 shown in FIG. 1.

Figure 3:
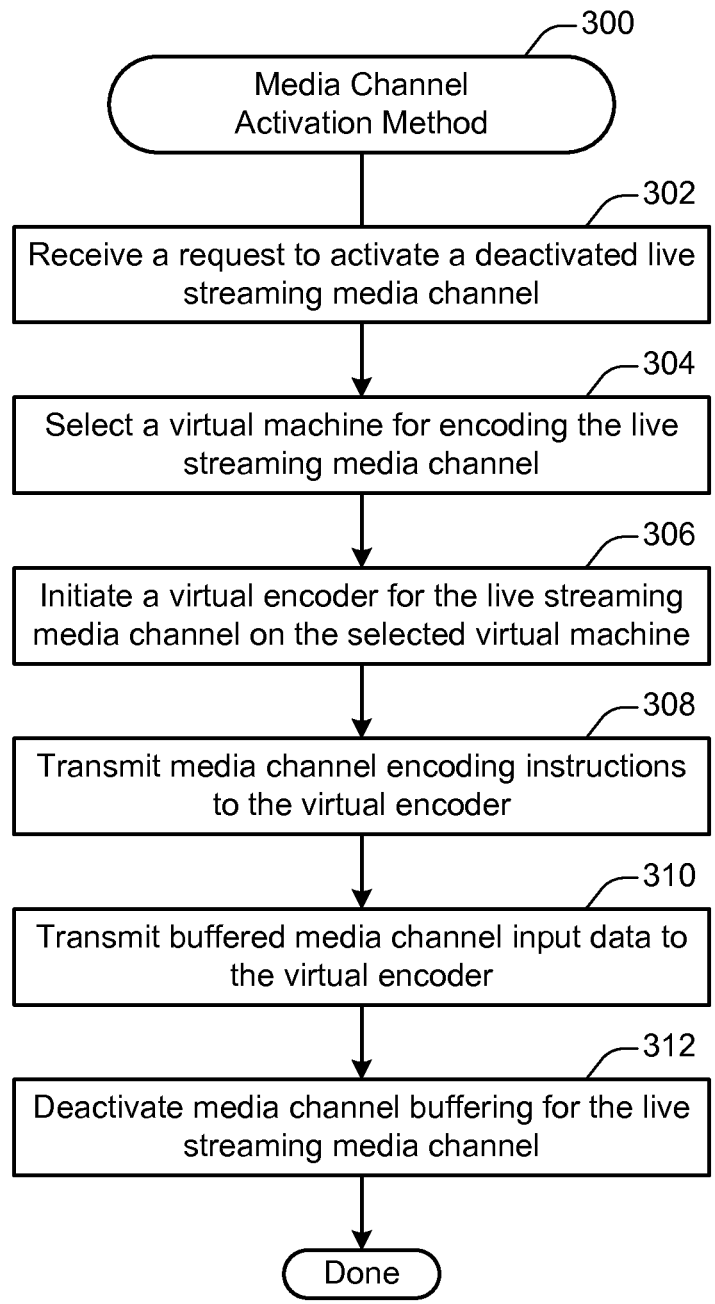
FIG. 3 illustrates an example of a method for activating a media channel.

FIG. 3 illustrates an example of a method 300 for activating a media channel, performed in accordance with one or more embodiments. The method 300 may be performed at a media system, such as the media system shown in FIG. 1. For instance, the method 300 may be performed when a request is received to activate a deactivated live streaming media channel, as discussed with respect to operation 208 shown in FIG. 2.

At 302, a request to activate a deactivated live streaming media channel is received. As discussed with respect to operation 208, such a request may be generated when a client device transmits a request for access to a live streaming media channel for which encoding has been deactivated. In some implementations, the request received at operation 302 may be received at a virtual encoder management module configured to manage virtual encoders for encoding potentially many different media channels. For instance, the request may be received at the virtual encoder management module 110 shown in FIG. 1.

At 304, a virtual machine is selected for encoding the live streaming media channel. According to various embodiments, a single virtual machine may host one or more virtual encoders. The virtual machine may be selected based on operational capacity of the virtual machine, load balancing between virtual machines, computing costs associated with different virtual machines, the type of encoding associated with the encoding of the live streaming media channel, or any other consideration.

In particular embodiments, initiating a virtual machine may involve some amount of computing overhead and delay. Accordingly, one or more virtual machines with at least some amount of unused capacity may be maintained in operation so that a virtual machine already in operation may be selected when initiating a virtual encoder. Alternately, or additionally, selecting a virtual machine may involve initiating a virtual machine not already in operation.

At 306, a virtual encoder is initiated for the live streaming media channel on the selected virtual machine. In some implementations, initiating the virtual encoder may involve transmitting an instruction to the selected virtual machine instructing the virtual machine to create a new instance of a channel encoder.

At 308, media channel encoding instructions are transmitted to the virtual encoder. According to various embodiments, initiating the encoder may involve one or more operations for configuring an encoding procedure for the live streaming media channel. For instance, one or more configuration parameters may be transmitted to the initiated virtual encoder.

In some embodiments, one configuration parameter may indicate a media content source for receiving new live streaming media channel input data for encoding. As discussed with respect to FIG. 1, the media content source may communicate directly or indirectly with the virtual encoder, for instance via the virtual encoder management module.

In some embodiments, one configuration parameter may indicate a bit rate and/or encoding quality for the virtual encoder. The bit rate and/or encoding quality may be associated with an amount of bandwidth needed to transmit the streaming media channel to the client device. For instance, a media channel may be encoded at a lower bit rate for transmission to a mobile device over a mobile network than for transmission to a stationary device via a wired network.

In some embodiments, one configuration parameter may indicate one or more encoding formats for the virtual encoder. An encoding format may indicate, for instance, that the channel is to be encoded for HTTP live streaming, DASH streaming, or any other type of streaming protocol. Other possible parameters may include, but are not limited to: encoder configuration parameters (e.g., picture resolution, frame rate, or track numbers) and/or parameters describing how the generated segment relates to other segments (e.g., segment number, time offsets, and/or segment name).

At 310, buffered media channel input data is transmitted to the virtual encoder. According to various embodiments, buffering and transmitting the buffered media channel input data may facilitate the rapid activation of a deactivated live streaming media channel. Alternately, or additionally, buffering and transmitting the buffered media channel input data may facilitate time shifting, in which a requester may view the live streaming media channel for some time period in the immediate past.

In particular embodiments, transmitting the buffered media channel input data may involve identifying buffered media channel input data associated with the deactivated live streaming media channel and stored in the deactivated channel buffer module 108 shown in FIG. 1. Once identified, this information may be transmitted to a virtual encoder via a network.

In some embodiments, the buffered media channel input data may indicate an interval in the input data. For example, the buffered media channel input data may indicate a range of MPEG-2 TS PTS times to be included in the encoded segment.

At 312, media channel buffering is deactivated for the live streaming media channel. According to various embodiments, deactivating the media channel buffering for the live streaming media channel may involve transmitting an instruction to the deactivated channel buffer module 108 to cease buffering for the live streaming media channel. When a virtual encoder is initiated for the live streaming media channel and when the data previously stored in the channel buffer module 108 for the live streaming media channel is encoded, then buffering new data for the live streaming media channel may no longer be necessary.

Figure 4:
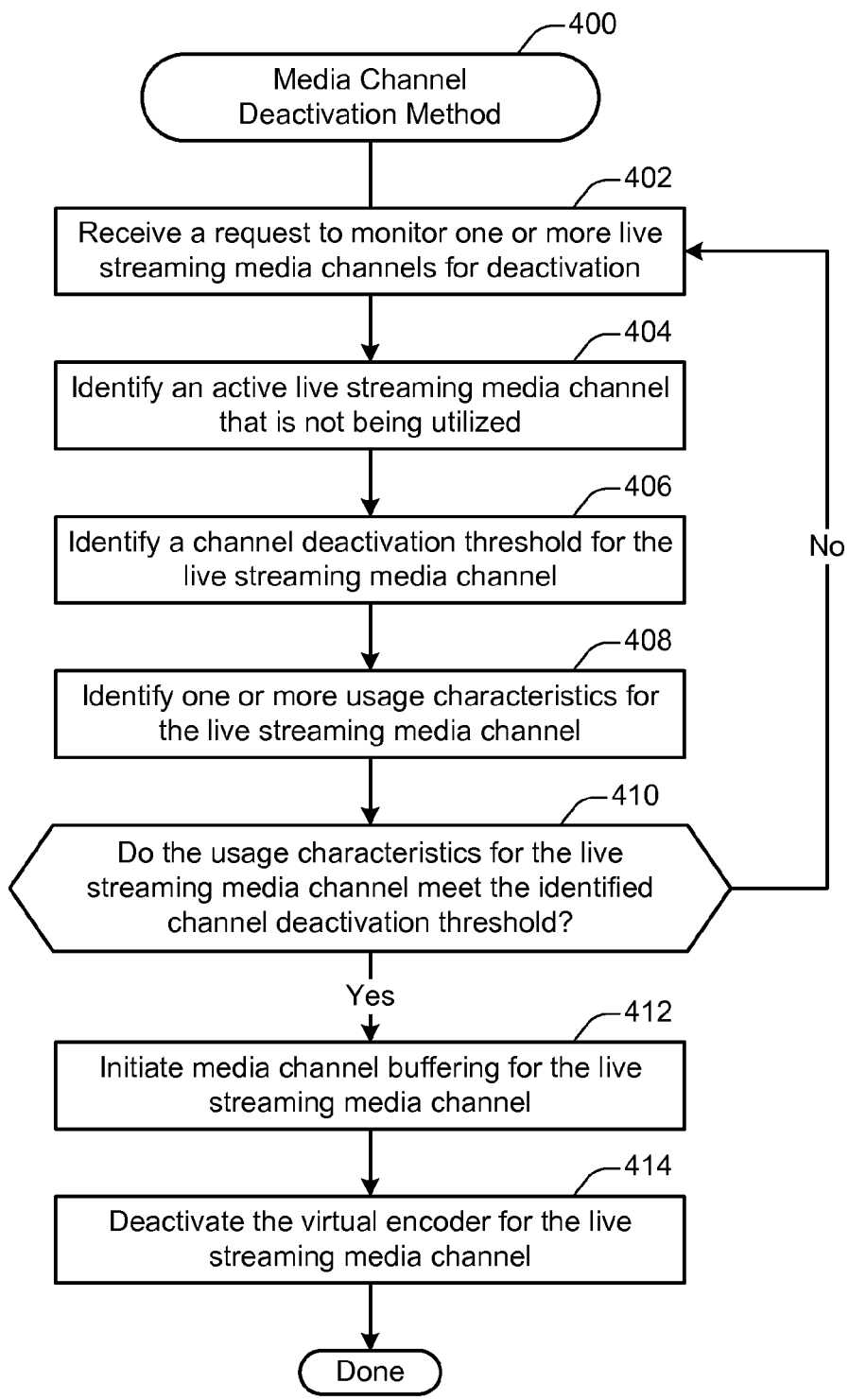
FIG. 4 illustrates an example of a method for deactivating a media channel.

FIG. 4 illustrates an example of a method 400 for deactivating a media channel. The method 400 may be performed at a media system, such as the media system shown in FIG. 1. For instance, the method 400 may be performed when a request is received to monitor one or more live streaming media channels for deactivation.

In particular embodiments, the method 400 may be performed continuously, periodically, or upon request. For example, the media system may monitor an activated live streaming media channel on a continuous or "as needed basis". As another example, the media system may monitor an activated live streaming media channel periodically or at scheduled times, such as every few minutes.

At 402, a request is received to monitor one or more live streaming media channels for deactivation. According to various embodiments, monitoring may be performed for any activated live streaming media channel. As discussed herein, an activated live streaming media channel may be one that is actively being encoded for transmission to one or more client machines. However, a live streaming media channel that is being encoded need not actually be transmitted to a particular client machine for the live streaming media channel to be activated.

At 404, an activated live streaming media channel that is not being utilized is identified. In some implementations, an activated live streaming media channel that is not being utilized may be any live streaming media channel that is being encoded but is not being transmitted to a client device. For instance, a channel may be available for viewing via the media system and may be encoded by the media system for viewing. However, the channel may not actually be requested for viewing.

In particular embodiments, the activated live streaming media channel may be identified by consulting one or more of the web server 104, the channel information management module 106, and the virtual encoder management module 110. For example, the web server 104 may maintain a record of which client devices are viewing which channels. As another example, the channel information management module 106 may maintain a record of the channels for which channel description information has been requested.

At 406, a channel deactivation threshold for the live streaming media channel is identified. According to various embodiments, a channel deactivation threshold may designate one or more characteristics or properties that indicate that an activated live streaming media channel should be deactivated. A single channel deactivation threshold may be common to more than one live streaming media channel or different live streaming media channels may be associated with different channel deactivation thresholds.

In particular embodiments, a channel deactivation threshold may indicate one or more of any of various properties. For example, a channel may be deactivated when it has not been transmitted to a client device for a designated period of time, such as 1 minute, 10 minutes, or 30 minutes. As another example, a channel may be deactivated when it is predicted that the likelihood of the channel being requested for viewing in the near future is relatively low. For instance, the channel may be carrying media content in the future that is similar to content that has had low viewership in the past.

In some implementations, a channel deactivation threshold may be manually configured. For instance, the channel deactivation threshold may be designated by a system administrator. Alternately, or additionally, a channel deactivation threshold may be dynamically determined. For instance, past channel usage characteristics may be analyzed to dynamically determine a likelihood of a channel being requested for viewing in the near future.

At 408, one or more usage characteristics for the live streaming media channel are identified. According to various embodiments, a usage characteristic may be any information that describes how and when the live streaming media channel has been recently viewed or is likely to be viewed. For example, the usage characteristics may identify how many times the channel has been requested for viewing in the recent past. As another example, the usage characteristics may identify past, current, or future media content available for viewing on the media channel. As yet another example, the usage characteristics may identify which users have requested the media channel for viewing in the past. For instance, past viewers of the channel may be compared with activated users of the media system to determine whether the media channel is likely to be requested for viewing in the near future.

At 410, a determination is made as to whether the usage characteristics for the live streaming media channel meet the identified channel deactivation threshold. According to various embodiments, the determination may be made by comparing the usage characteristics identified at operation 408 with the channel deactivation threshold identified at operation 406.

At 412, media channel buffering for the live streaming media channel is initiated. According to various embodiments, initiating media channel buffering may involve transmitting a buffering initiation instruction to the deactivated channel buffer module 108. Buffering may be initiated by performing one or more operations such as allocating buffer space for storing channel data, identifying a media channel source for receiving live streaming media input data for buffering, and designating a time interval for storing buffered input data.

At 414, the virtual encoder for the live streaming media channel is deactivated. According to various embodiments, deactivating the virtual encoder may involve transmitting a deactivation message to an actual or virtual machine at which the virtual encoder is located. When the virtual encoder is deactivated, the encoding of the live streaming media channel is stopped and the live streaming media channel is placed in a deactivated state. Placing the live streaming media channel in a deactivated state may involve, for instance, updating a record of channel status in the channel information module 106 and/or virtual encoder management module 110.

Figure 5:
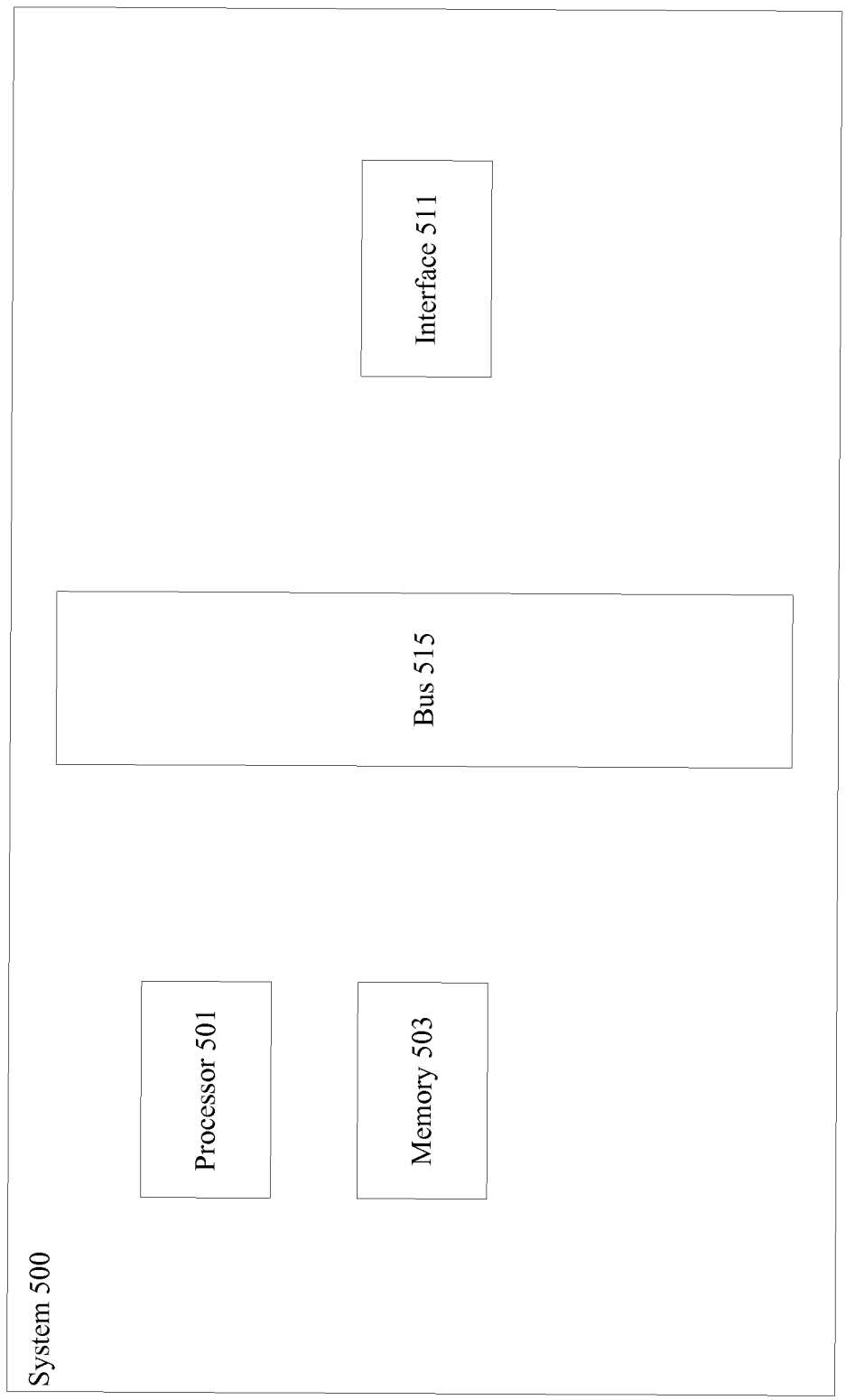
FIG. 5 illustrates an example of a system.

FIG. 5 illustrates one example of a computing device. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting live media data to a client. Alternately, or additionally, the system 500 may be configured as a client device operable to receive and present media content items. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
receiving from a client device a request to access a live streaming media channel provided based on live streaming media channel input data, the live streaming media channel being in a deactivated state in which the live streaming media channel input data is not being encoded for transmission to client devices, the live streaming media channel being associated with a live streaming media channel buffer storing an interval of the live streaming media channel input data received while the live streaming media channel was in the deactivated state;
initiating a virtual encoder for encoding the live streaming media channel, the virtual encoder configured to encode the live streaming media channel input data including the buffered live streaming media channel input data to create live streaming media channel encoded data for transmission to client devices, the live streaming media channel encoded data being divided into a plurality of segments each having an associated segment length, the interval of live streaming media channel data stored in the buffer while the live streaming media channel is in a deactivated state being longer than the segment length; and
transmitting the live streaming media channel encoded data to the client device.

2. The method recited in claim 1, wherein the virtual encoder is implemented as a non-static resource on a virtual machine, the non-static resource capable of being activated and deactivated upon request.

3. The method recited in claim 1, the live streaming media channel input data including at least one random access point, the virtual encoder creating a segment of live streaming media channel encoded data starting with the random access point and having a length corresponding with the segment length.

4. The method recited in claim 1, wherein the virtual encoder encodes the live streaming media channel input data faster than real-time.

5. The method recited in claim 1, wherein a plurality of virtual encoders are initiated for encoding the live streaming media channel, each virtual encoder encoding a respective portion of the interval of live streaming media channel data encoded in the live streaming cyclic media channel buffer.

6. The method recited in claim 1, the method further comprising:
generating channel description information characterizing the live streaming media channel encoded data; and
transmitting the channel description information to the client device.

7. The method recited in claim 6, wherein the channel description information comprises a Hypertext Transfer Protocol (HTTP) Live Streaming (HLS) manifest file.

8. The method recited in claim 7, wherein the HLS manifest file is a file selected from the group consisting of: an HLS m3u8 file, a Dynamic Adaptive Streaming over HTTP (DASH) Media Presentation Description (MPD) file, and a SmoothStreaming manifest file.

9. The method recited in claim 1, the method further comprising:
transmitting an encoding instruction designating one or more encoding parameters to the virtual encoder.

10. The method recited in claim 9, wherein the encoding parameter is a parameter selected from the group consisting of: a bit rate, an encoding format, and an encoding quality.

11. The method recited in claim 1, the method further comprising:
deactivating the live streaming media channel buffer.

12. The method recited in claim 11, wherein a live streaming media channel buffer is deactivated when the virtual encoder has encoded the data stored in the buffer.

13. The method recited in claim 1, wherein the live streaming media channel is placed in the deactivated state when it is determined that the live streaming media channel is not being accessed by any client device.

14. The method recited in claim 13, wherein the live streaming media channel is placed in the deactivated state when it is further determined that an actual or predicted usage criterion associated with the live streaming media channel meets a designated deactivation threshold.

15. The method recited in claim 1, wherein the request is received at a media system configured to provide access to a plurality of on-demand media channels to a plurality of remote computing devices, the plurality of on-demand media channels including the live streaming media channel, the plurality of remote computing devices including the client device.

16. A system comprising:
a communications interface operable to receive from a client device a request to access a live streaming media channel provided based on live streaming media channel input data, the live streaming media channel being in a deactivated state in which the live streaming media channel input data is not being encoded for transmission to client devices, the live streaming media channel being associated with a live streaming media channel buffer storing an interval of the live streaming media channel input data received while the live streaming media channel was in the deactivated state; and
a processor operable to:
initiate a virtual encoder for encoding the live streaming media channel, the virtual encoder configured to encode the live streaming media channel input data including the buffered live streaming media channel input data to create live streaming media channel encoded data for transmission to client devices, the live streaming media channel encoded data being divided into a plurality of segments each having an associated segment length, the interval of live streaming media channel data stored in the buffer while the live streaming media channel is in a deactivated state being longer than the segment length, and
provide the encoded live streaming media channel for access by the client device.

17. The system recited in claim 16, wherein the virtual encoder is implemented as a non-static resource on a virtual machine, the non-static resource capable of being activated and deactivated upon request.

18. The system recited in claim 16, the live streaming media channel input data including at least one random access point, the virtual encoder creating a segment of live streaming media channel encoded data starting with the random access point and having a length corresponding with the segment length.

19. The system recited in claim 16, wherein the virtual encoder encodes the live streaming media channel input data faster than real-time.

20. One or more non-transitory computer readable media having instructions stored thereon for performing a method, the method comprising:
receiving from a client device a request to access a live streaming media channel provided based on live streaming media channel input data, the live streaming media channel being in a deactivated state in which the live streaming media channel input data is not being encoded for transmission to client devices, the live streaming media channel being associated with a live streaming media channel buffer storing an interval of the live streaming media channel input data received while the live streaming media channel was in the deactivated state;
initiating a virtual encoder for encoding the live streaming media channel, the virtual encoder configured to encode the live streaming media channel input data including the buffered live streaming media channel input data to create live streaming media channel encoded data for transmission to client devices, the live streaming media channel encoded data being divided into a plurality of segments each having an associated segment length, the interval of live streaming media channel data stored in the buffer while the live streaming media channel is in a deactivated state being longer than the segment length; and
transmitting the live streaming media channel encoded data to the client device.

\* \* \* \* \*